(12) United States Patent
Tahkokallio et al.

(10) Patent No.: US 11,045,720 B2
(45) Date of Patent: Jun. 29, 2021

(54) APPARATUS AND METHOD FOR CONTROLLING USER INTERFACE OF COMPUTING APPARATUS

(71) Applicant: Supercell Oy, Helsinki (FI)

(72) Inventors: Touko Tahkokallio, Espoo (FI); Jonne Loikkanen, Helsinki (FI); Jon Franzas, Helsinki (FI)

(73) Assignee: Supercell Oy, Helsinki (FI)

( * ) Notice: Subject to any disclaimer, the term of this patent is extended or adjusted under 35 U.S.C. 154(b) by 187 days.

(21) Appl. No.: 16/519,340

(22) Filed: Jul. 23, 2019

(65) Prior Publication Data

US 2020/0016483 A1 Jan. 16, 2020

Related U.S. Application Data

(63) Continuation of application No. 15/618,179, filed on Jun. 9, 2017, now Pat. No. 10,413,814.

(51) Int. Cl.
*A63F 13/2145* (2014.01)
*G06F 3/0488* (2013.01)
*A63F 13/837* (2014.01)
*A63F 13/426* (2014.01)
*A63F 13/537* (2014.01)

(52) U.S. Cl.
CPC ........ *A63F 13/2145* (2014.09); *A63F 13/426* (2014.09); *A63F 13/537* (2014.09); *A63F 13/837* (2014.09); *G06F 3/04883* (2013.01)

(58) Field of Classification Search
CPC .. A63F 13/2145; A63F 13/537; A63F 13/426; A63F 13/837; A63F 13/42; A63F 2300/1075; A63F 2009/241; G06F 3/04883
See application file for complete search history.

(56) References Cited

U.S. PATENT DOCUMENTS

| 2015/0094127 | A1* | 4/2015 | Canose | G06F 3/04842 463/2 |
| 2016/0048285 | A1* | 2/2016 | Jwa | G06F 3/04842 715/769 |
| 2017/0017314 | A1* | 1/2017 | Claras De Luna | G06F 3/04883 |

* cited by examiner

*Primary Examiner* — Jasson H Yoo
(74) *Attorney, Agent, or Firm* — Ziegler IP Law Group, LLC

(57) ABSTRACT

Disclosed is an apparatus including a touch sensitive user interface and a processor. The processor is configured to detect a first contact at a first position on the user interface, determine a movement of the first contact from the first position and if the movement is less than a predetermined movement threshold, when a release of the first contact is detected, move a first object on the user interface from an initial position on the user interface to an area at or near the first position. If the movement is greater than the predetermined movement threshold to identify a second position corresponding to an area near an end point of the movement and when the release of the first contact is detected, execute an action on the second position from the first object.

18 Claims, 10 Drawing Sheets

APPARATUS AND METHOD FOR CONTROLLING USER INTERFACE OF COMPUTING APPARATUS

TECHNICAL FIELD

The present disclosure relates generally to user interfaces; and more specifically, to graphical user interfaces for gaming systems.

BACKGROUND

Generally, usage of portable communication devices such as smartphones and tablet computers have increased manifold over the recent years. Further, apart from use for communication, navigation, increasing productivity, and so forth, such devices are also used for providing entertainment to a user thereof. For example, the devices usually have applications that allow users to watch videos, read books, capture images and engage in social networking. Additionally, the devices may also have applications that allow users to play games.

Usually, the games may have an object (such as a character) that is controlled to complete various objectives of the game, such as collect rewards or eliminate other objects from the game. Conventionally, such objects are controlled by pressing one or more keys on a keypad associated with a device. However, with the introduction of smartphones having a touchscreen (and lacking the keypad associated with conventional mobile phones), control of such objects is associated with various problems.

For example, generally, part of an area of graphical user interface of a game is reserved for providing controls such as a virtual keyboard, one or more buttons for activating abilities possessed by the object and so forth. However, such reservation of the area of the graphical user interface reduces an area available for displaying elements and/or information associated with the game. Additionally, in an instance when the game employs complex gaming mechanics, the graphical user interface may be substantially blocked from view of the user due to placement of multiple fingers on the touchscreen. It will be appreciated that such problems result in a cumbersome gaming experience for the user.

Moreover, to overcome the problems, a game may employ simplified gaming mechanics such as limited controls, limited abilities possessed by the objects, auto-movement, auto-aiming, auto-firing, slow gameplay speed and so forth. Such simplification of the gaming mechanics makes for a less challenging, and consequently, a less enjoyable gaming experience for the user.

Therefore, in light of the foregoing discussion, there exists a need to overcome the aforementioned drawbacks associated with gaming experience.

SUMMARY

The present disclosure seeks to provide an apparatus. The present disclosure also seeks to provide a method for controlling a user interface of a computing apparatus. The present disclosure seeks to provide a solution to the existing problems associated with gaming on devices having a touch sensitive user interface. An aim of the present disclosure is to provide a solution that overcomes at least partially the problems encountered in prior art, and provides simple and effective control of touch sensitive user interface, thereby enabling an enjoyable gaming experience.

In one aspect, an embodiment of the present disclosure provides an apparatus comprising: a touch sensitive user interface; and
a processor;
wherein the processor is configured to:
  detect a first contact at a first position on the user interface;
  determine a movement of the first contact from the first position; and
  if the movement is less than a predetermined movement threshold, when a release of the first contact is detected, move a first object on the user interface from an initial position on the user interface to an area at or near the first position; or
  if the movement is greater than the predetermined movement threshold:
    identify a second position corresponding to an area near an end point of the movement; and
    when the release of the first contact is detected, execute an action on the second position from the first object.

In another aspect, an embodiment of the present disclosure provides a method for controlling a user interface of a computing apparatus, the computing apparatus comprising a processor configured to execute machine readable instructions, wherein execution of the machine-readable instructions by the processor causes the processor to:
  detect a first contact at a first position on the user interface;
  determine a movement of the first contact from the first position; and
  if the movement is less than a predetermined movement threshold, when a release of the first contact is detected, move a first object on the user interface from an initial position on the user interface to an area at or near the first position; or
  if the movement is greater than the predetermined movement threshold:
    identify a second position corresponding to an area near an end point of the movement; and
    when the release of the first contact is detected, execute an action on the second position from the first object.

Embodiments of the present disclosure substantially eliminate or at least partially address the aforementioned problems in the prior art, and enable simple and convenient control of touch sensitive user interface.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 2A, 2B, 2C to 7 are user interfaces of the apparatus of FIG. 1, in accordance with various embodiments of the present disclosure.

Figure 1:
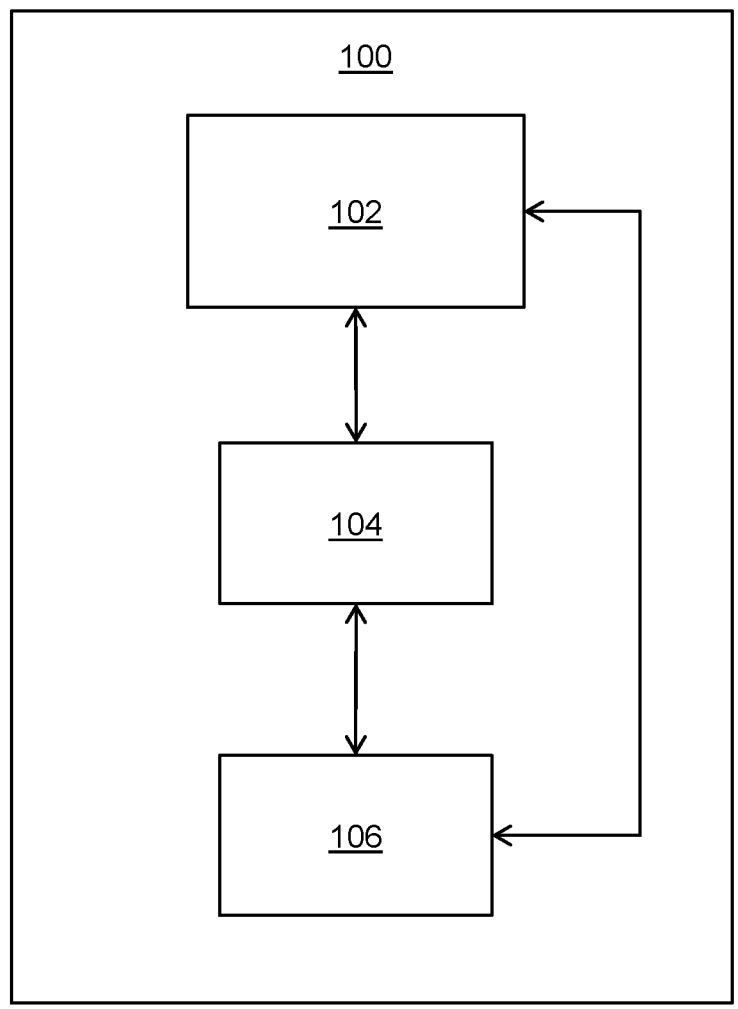
FIG. 1 is a block diagram of an apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides an apparatus comprising:
a touch sensitive user interface; and
a processor;
wherein the processor is configured to:
  detect a first contact at a first position on the user interface;
  determine a movement of the first contact from the first position; and
  if the movement is less than a predetermined movement threshold, when a release of the first contact is detected, move a first object on the user interface from an initial position on the user interface to an area at or near the first position; or
  if the movement is greater than the predetermined movement threshold:
    identify a second position corresponding to an area near an end point of the movement; and
    when the release of the first contact is detected, execute an action on the second position from the first object.

In another aspect, an embodiment of the present disclosure provides a method for controlling a user interface of a computing apparatus, the computing apparatus comprising a processor configured to execute machine readable instructions, wherein execution of the machine-readable instructions by the processor causes the processor to:
  detect a first contact at a first position on the user interface;
  determine a movement of the first contact from the first position; and
  if the movement is less than a predetermined movement threshold, when a release of the first contact is detected, move a first object on the user interface from an initial position on the user interface to an area at or near the first position; or
  if the movement is greater than the predetermined movement threshold:
    identify a second position corresponding to an area near an end point of the movement; and
    when the release of the first contact is detected, execute an action on the second position from the first object.

The apparatus comprises a touch sensitive user interface. In an embodiment, the apparatus is a portable communication device. For example, the apparatus is a smartphone, a tablet computer, a laptop computer and so forth. In such instance, the touch sensitive user interface of the apparatus is a touchscreen display of the portable communication device. It will be appreciated that the touch sensitive user interface allows a user of the apparatus to interact with the apparatus. For example, the user of the apparatus may provide an input to the apparatus on a graphical user interface that is rendered on the touch sensitive user interface.

The apparatus further comprises a processor. The processor of the apparatus is operable to receive one or more inputs provided by the user of the apparatus using the touch sensitive user interface and provide a corresponding response. For example, the input comprises an instruction to launch an application (or "app") installed on the portable communication device. In such instance, the input instruction is provided by the user using a tap contact (or "gesture") on an icon associated with the application that is presented on the touch sensitive user interface of the apparatus.

In an embodiment, an input provided by the user comprises an instruction to launch a gaming application. In such instance, the processor is configured to start the gaming application (or game) subsequent to receiving the input provided by the user. Further, the processor is configured to render a graphical user interface (or user interface) associated with the game on the touch sensitive user interface. In an example, the game can be one of an action game, a role-playing game (RPG), a strategy game, a shooting game, a puzzle game and so forth. It will be appreciated that the game may comprise a playing field that is rendered on the user interface. Further, the playing field may comprise one or more objects, such as characters, that are controlled by the user (or player) of the apparatus. Additionally, the playing field can also comprise one or more obstacles, such as walls, to restrict movement of the one or more objects to specific areas within the playing field. Optionally, the playing field comprises one or more elements, such as stars, health pick-ups or ammunition pick-ups, to provide assistance to the player and/or increase a score associated with performance of the player. Moreover, the user interface may also present one or more indicators to provide information to the player, such as information associated with a score of the game or health of the objects.

In an example, the game comprises a player-controlled object and one or more other objects (such as enemy characters). In one embodiment, the one or more other objects are controlled by other players of the game. Alternatively, the one or more other objects are computer-controlled, such as, using an artificial intelligence (AI) algorithm.

In one example, the objects possess various skills or abilities that are used by the player of the game to accomplish a goal. For example, the objects possess one or more weapons that can be used to eliminate other objects from the game. Such skills or abilities may be activated by the player of the game using one of a plurality of pre-determined contacts with the touch sensitive user interface of the apparatus. The processor may be configured to determine the pre-determined contacts in a manner explained herein below.

The processor is configured to detect a first contact with the user interface at a first position on the user interface. In one embodiment, the processor can record the first position of the first contact. For example, in one embodiment, the first position of the first contact may refer to a location co-ordinates in the user interface such as XY co-ordinates. Position (0,0) could refer to top left corner of the user interface (i.e. a touch screen/a display of a device) and (MaxX, 0) to top right corner, (0, MaxY) to bottom left corner and (MaxX, MaxY) to bottom right corner wherein MaxX is a number of pixels in horizontal direction of the user interface and MaxY is a number of pixels in vertical direction of the user interface. The co-ordinate system used may be arbitrary units. For example, the co-coordinate system can be defined to be such that in the horizontal direction (X direction) the co-ordinates start from 0 and go defined number of units such as 1000 and in a horizontal direction and in vertical direction (Y-direction) the co-ordinates start from 0 and go the other defined number of units such as 500. This way co-ordinate system thus position of the contact can be defined independent of screen size and resolution of the user interface. The first contact may refer to touching the user interface with a finger or another pointer. In alternate embodiments, and suitable method can be used to record the first position.

The processor is configured to detect a movement of the first contact within the user interface from the first position to a second position. For example, this might be movement of the finger from a first position (X1=100, Y1=120) to a second position (X2=70, Y2=140). The processor is further configured to determine a distance between the first position and the second position. For example, and referring to above values of X1, Y1, X2, Y2, the distance could be in X-direction 30 units and in Y-direction 20 units. Further the distance could be from point (X1,Y1) to (X2,Y2) calculated as sqrt(30^2+20^2)=36 units.

Further, the processor is configured to detect a release of the first contact from the user interface. In one embodiment, the processor is configured to execute a move of a first object on the user interface or an action on the second object when the release is detected.

For example, in one embodiment, the processor is configured to compare the determined distance of the movement between the first position and the second position to a pre-determined movement threshold or distance threshold. Further, the processor is configured to determine a type of the first contact and an action to be executed on the user interface with respect to a first object rendered on the user interface based on the comparison. In one embodiment, a range of the predetermined movement threshold can be between approximately 3% to and including approximately 12% of a distance between opposite sides of the user interface. A range of a movement that is less than the predetermined movement threshold can be less than approximately 12% of a distance between opposite sides of the user interface. Preferably range of predetermined movement threshold is between 4%-8% of the distance between opposite sides of the user interface. More preferably 6% of the distance between opposite sides of the user interface.

For example, and using above values X1, Y2, X2, Y2, if the pre-determined movement or distance threshold is 40 units the determined distance (36) is less than the pre-determined distance threshold. If the pre-determined distance threshold is 32 units then the determined distance (36) is larger than the pre-determined distance threshold.

In one embodiment, when the determined distance is less than the pre-determined distance threshold, the type of first contact is determined to be a move instruction and the first object is configured to move from a current position on the user interface to an area of the second position. According to the embodiment the movement action is executed when a release of the first contact from the user interface is detected. The area of the second position may refer to an area, which centre point is the second position where the release of the finger took place from the user interface. The area could be for example area of 5×5 units. In an example, the pre-determined distance threshold is 5% of width (x-direction when the user interface is in landscape orientation) of the user interface. If the width is for example 1000 units, the pre-determined distance threshold would be 50 units. In such instance, upon determination of the determined distance being less than 50 units second (such as 10 units), the processor is configured to determine the type of first contact to be the move instruction. It will be appreciated that the first object (such as a player-controlled character) may be rendered at a pre-determined location on the user interface upon start of the game. In an example, the first object is located in a central area of the playing field at the start of the game. Further, the player of the game may be required to move the first object to other locations of the playing field, such as to collect a reward or escape an attack from another object. In such instance, the player performs a "move" contact (i.e. the finger does not move at all or the movement does not exceed the predetermined distance threshold) on a desired area of the user interface to move the object from its current location, such as the central area, to the area of the first contact (i.e. an area corresponding to the place where the finger was released from the user interface), or the desired area. It will be appreciated that the movement of the first object using such contact made by the player allows elimination of requirement of controls (such as virtual keyboards) to be presented on the user interface. Further, such elimination of the controls provides more area for displaying elements and/or information associated with the game. Additionally, such movement of the first object by the contact made by the first player allows faster response, thereby enabling fast-paced, exciting and more enjoyable games to be provided to players.

In an embodiment, when the determined distance is greater than the pre-determined movement or distance threshold, the type of the first contact is determined to be an action instruction and the first object is configured to execute an action on the user interface other than including a move. In an instance when the pre-determined distance threshold is 50 units (such as 5% of x-direction distance) second and the distance between the first position and the second position is more than 50 units, the type of the first contact is determined to be an action instruction.

In one example, the type of first contact is a touch-and-move finger contact (or "action contact") by the player on the touch sensitive user interface. In another example, the first object is configured to execute the action to eliminate one or more of other objects from the game. According to an embodiment, the action comprises firing by the first object on another object presented on the user interface. For example, the first object discharges one or more projectiles (such as bullets) from a weapon possessed thereby towards another object (such as a character controlled by another player) on the user interface. According to the embodiment the action is executed when a release of the first contact from the user interface is detected.

According to an embodiment, when it is determined that the first action is the action instruction the processor is further configured to generate an indicator, such as a sector on the user interface, the sector defining a path for the action executed by the first object and the sector having direction from a current position of the first contact towards a direction associated with the second position, or the position of the second contact. In one embodiment, the current position of the first contact is an approximate end point or second position of the movement of the first contact. The sector is can be generated from the position of the first object in a direction towards the second position of the first contact. The sector area overlaps in this embodiment with the co-ordinate points of the second position. Alternatively, the direction of the sector from the first object might be related to a direction from the first position to the second position.

As an example, if the first object is at co-ordinates (200,50) and a first position is at co-ordinates (10,20) and a second position is at co-ordinates (10, 100) the sector would direct to direction of y-direction in the user interface from the current position of the first object. It will be appreciated that the one or more objects in the playing field may have different orientations with respect to each other at various times of the game. For example, the first object may be in an orientation that is obscured from a line of sight of another object that the player is required to eliminate to win the game. In such instance, the player is required to move the first object to change the orientation thereof to be in line of sight of the other object. Subsequently, the first object is required to fire at the other object to eliminate the other object from the game. In such instance, the player executes an action type contact from the current position of the first object in the first direction (such as a direction of the other object) to generate a sector on the user interface. Alternatively, the player executes the action type contact from a position relative to the current position of the first object. In one example, the user executes the action type contact from one of left, right, below, or above the first object to generate the sector on the user interface. According to one embodiment the sector might be rendered on the user interface as soon as the determined distance from the first contact exceeds the pre-determined threshold. The action related to the sector (such as shooting at the direction to sector) might be executed when the release of the first contact from the user interface is detected.

According to an embodiment, in one embodiment either alone or in combination with the other embodiments described herein, the processor is further configured to render a trajectory line on the user interface from the area of the first contact and in the direction of the second position. Alternatively, the trajectory line might be rendered from the first object to a direction which can be derived from relative positions of the first position and the second position to each other. In an example, the trajectory line defines the path of travel of projectiles fired by the first object towards the other object. In one embodiment, the processor is configured to execute the action when the processor detects the release of the first contact from the user interface. For example, upon release of contact from the user interface by the player, the projectiles are fired along the path defined by the trajectory line towards the other object. It will be appreciated that such determination of action instruction based on the type of contact allows faster response, such as enabling the first object to quickly fire at another object. Additionally, such determination of action instruction enables reduction in use of gaming mechanics such as auto-aiming, auto-firing and so forth, thereby enabling a more exciting and enjoyable gaming experience.

In an embodiment, the processor is further configured to detect a rotational movement contact on the user interface following the action and to rotate the sector in a direction on the user interface corresponding to the rotational movement. For example, the other object may have changed its orientation with respect to the first object during movement of the first object. Consequently, the player is required to adjust the path of travel of the projectiles fired by the first object in response to the change in orientation of the other object. In such instance, upon executing the action to generate the sector, the player executes a rotational movement contact to rotate the sector in a desired direction. In one example, rotational movement contact is executed without release of contact. In one embodiment, the rotational movement contact is executed by contact of one or more fingers of the player inside an area defined by the sector. Alternatively, the rotational movement contact is executed by contact of one or more fingers of the player in a position relative to the area defined by the sector. For example, one or more fingers of the player contact the touch sensitive user interface at left, right, above or below the area defined by the sector to execute the rotational movement contact. Additionally, such rotational movement contact allows the player to rotate the sector in a clockwise direction and/or in an anti-clockwise direction.

According to an embodiment, the processor is configured to render a control object on the user interface, the control object being configured to be rotated in one or more of a clockwise and counter-clockwise direction to rotate the sector in one or more of the clockwise or counter-clockwise direction. In one example, the control object is a control button that can be moved within a circular area. In such instance, position of the control button with respect to a default position thereof (such as a centre of the circular area) within the circular area determines the rotation of the sector in one or more of a clockwise and counter-clockwise direction. In another example, displacement of the control button from the centre of the circular area may determine one or more attributes (such as speed or damage output) of projectiles fired by the first object. In such instance, a larger displacement of the control button from the default position in the circular area may fire projectiles at a higher speed as compared to a smaller displacement of the control button from the default position. In an example, the control object is a virtual joystick that is rendered on the user interface. The player may be required to rotate the virtual joystick in the clockwise and/or the counter-clockwise direction to rotate the sector.

In one embodiment, the processor is configured to detect a pattern drawn in a first direction from the current position of the first object over the user interface following the first contact, for defining a path for an action to be executed by the first object. In an example, the first object has one or more additional weapons (such as grenades) that can be fired thereby towards another object. However, the trajectory of the one or more additional weapons may not constitute a linear path. In such instance, the player draws a pattern on the user interface for defining the path for firing the one or more additional weapons. In an embodiment, the processor is further configured to determine a distance on the user interface from the area of the first contact to an area of the release, wherein the distance determines a reach of the action. In another embodiment, the processor is further configured to render a trajectory arc on the user interface from the area of the first contact and along the pattern drawn over the user interface. In an example, the player executes a flicking action on the user interface, such that the flicking action constitutes a short circular arc. In such instance, the distance on the user interface from the area of the first contact to the area of the release may define the reach of one or more projectiles fired by the first object in response to the flicking action.

According to one embodiment, the processor is configured to render one or more buttons on the user interface. For example, the one or more buttons are associated with special actions or abilities that can be activated by the player by performing a tap contact thereon. In an example, the special actions are gained by the first object by collection of rewards (such as stars) that are located at various areas on the user interface and/or by eliminating other players.

In one embodiment, the processor is configured to detect more than one contact with the user interface. In an example, the more than one contact with the user interface is associated with the player using multiple fingers to play the game. In one example, the player performs tap contacts on multiple areas of the user interface using more than one finger to define a path for movement of the first object.

The present description also relates to a method for controlling a user interface of a computing apparatus, the computing apparatus comprising a processor configured to execute machine readable instructions, wherein execution of the machine-readable instructions by the processor causes the processor to detect a first contact with the user interface. In one embodiment, the processor records a first position of the first contact. Further, the processor detects a movement of the first contact from the first position to a second position and determines a distance of the movement, or the distance between the first position and the second position. Additionally, the processor compares the determined distance to a pre-determined movement or distance threshold and determines a type of the first contact. If the movement is less than a predetermined movement threshold, when a release of the first contact is detected, a first object on the user interface is moved from an initial position on the user interface to an area at or near the first position. If the movement is greater than the predetermined movement threshold a second position corresponding to an area near an end point of the movement is identified, and when the release of the first contact is detected, an action is executed on the second position from the first object. The area near an end point of the movement can correspond to circular area with radius X or other geometrical area such as a square with width Y surrounding the point where the release of the first contact is detected. The radius X (or the width Y of the square) can be for example 1%-20%, 3%-10% or 3%-5% of total width of the user interface.

In an embodiment, the action executed by the processor comprises causing the first object to fire on another object presented on the user interface.

According to one embodiment, execution of the machine-readable instructions causes the processor to present an indicator on the user interface that extends from the first object towards the end point when the determined movement is greater than the predetermined movement threshold. In one embodiment, the indicator has an origin corresponding to a current location of the first object and an end that moves with the movement of the first contact.

For example, the processor can be caused to generate a sector on the user interface, the sector defining a path for the action executed by the first object. The sector can have a direction from a current position towards a direction associated with the second position. The association might refer to be from the current position to the second position. Alternatively, the association might refer to comparing relative position of the second position to the first position (making direction vector from the first position to second position and using that as a direction of the sector from the current position).

In one embodiment, execution of the machine-readable instructions causes the processor to render a trajectory line on the user interface from the area of the first contact and in the direction associated with the second position, the trajectory line having a direction from a current position towards a direction associated with the second position. The association might refer to be from the current position to the second position. Alternatively, the association might refer to comparing the relative position of the second position to the first position (making direction vector from the first position to second position and using that as a direction of the trajectory line from the current position).

In an embodiment, execution of the machine-readable instructions by the processor causes the processor to detect a rotational movement contact on the user interface to rotate the sector on the user interface in a direction corresponding to the rotational movement.

According to an embodiment, execution of the machine-readable instructions causes the processor to render a control object on the user interface, to detect a rotation of the control object in one or more of a clockwise and counter-clockwise direction, and to rotate the sector in one or more of the clockwise or counter-clockwise direction corresponding to the detected rotation.

In one embodiment, execution of the machine-readable instructions causes the processor to execute the action when the processor detects the release of the first contact from the user interface.

According to one embodiment, execution of the machine-readable instructions causes the processor to determine a distance on the user interface from the area of the first contact to an area of the release, wherein the distance determines a reach of the action.

The apparatus and method enable determination of the type of contact with the user interface by comparison of the distance of movement between the first position and the second position to a pre-determined distance threshold. Such determination enables easy identification of various types of contact that can be made by the user (such as movement or action) with the user interface. Further, the pre-determined distance threshold can be varied, allowing increased adaptability in determination of types of contact. Additionally, the action to be executed on the user interface with respect to the first object rendered on the user interface is determined based on the comparison. Such comparison enables faster determination of the action to be performed by the first object, thereby enabling a more exciting and enjoyable gaming experience. Moreover, such determination of the types of contact eliminates a requirement of on-screen controls, thereby enabling de-cluttering of the user interface and allowing more area to be provided for presentation of important elements and/or information associated with a game.

DETAILED DESCRIPTION OF THE DRAWINGS

FIG. 1 is a block diagram of an apparatus 100, in accordance with an embodiment of the present disclosure. As shown, the apparatus 100 comprises a touch sensitive user interface 102, a processor 104 and a distance determination unit 106.

Figure 2A:
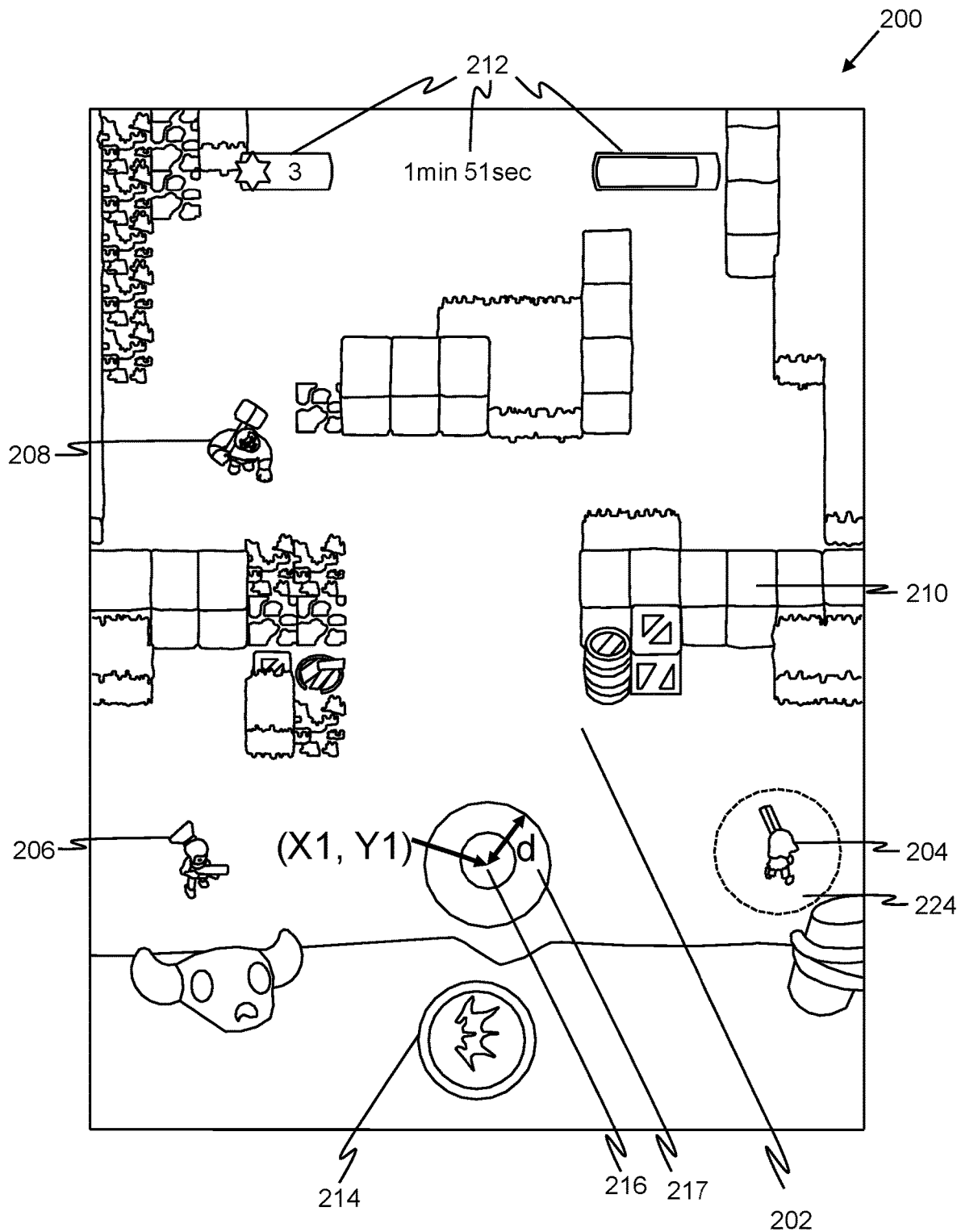
Figure 2B:
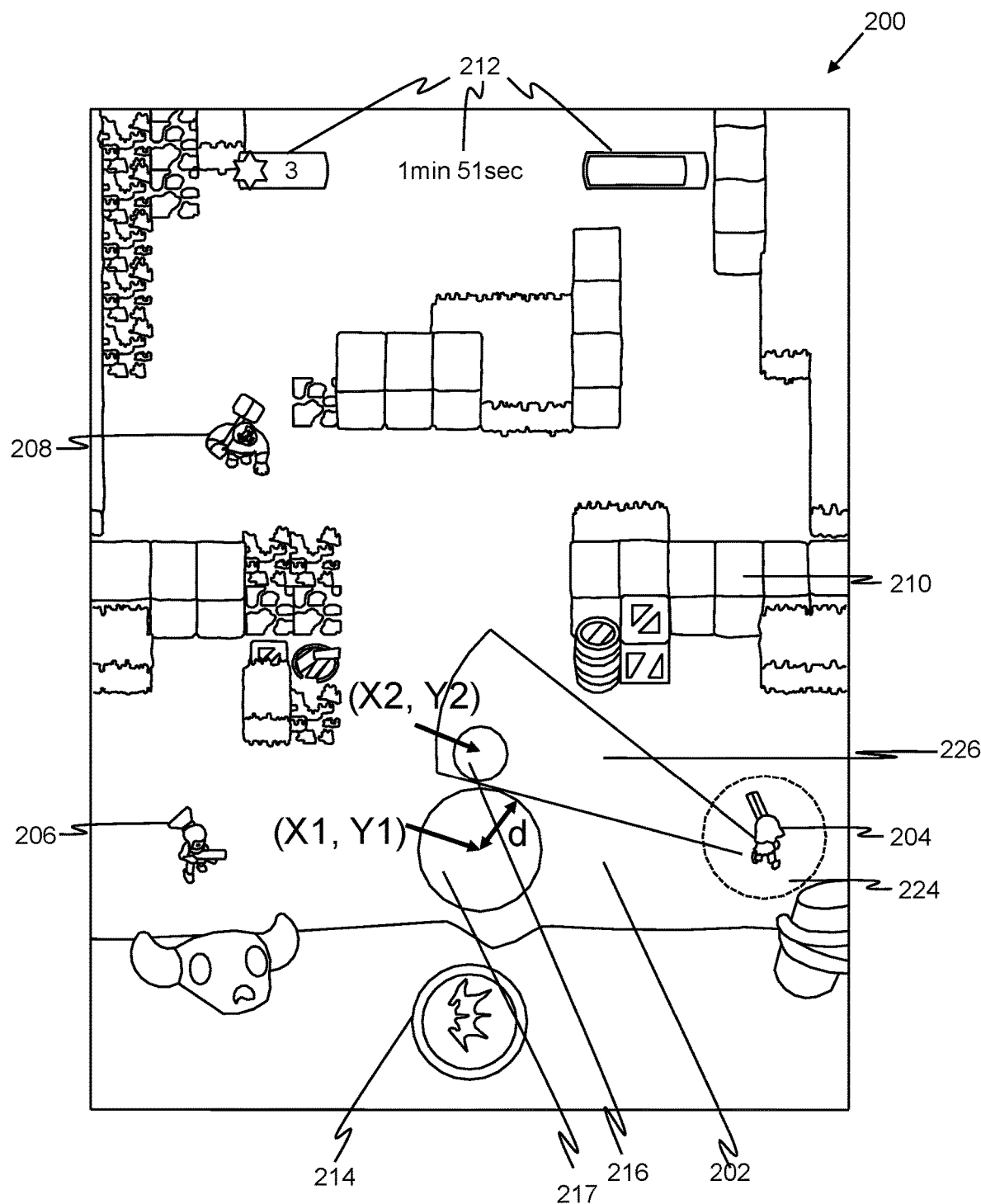
Figure 2C:
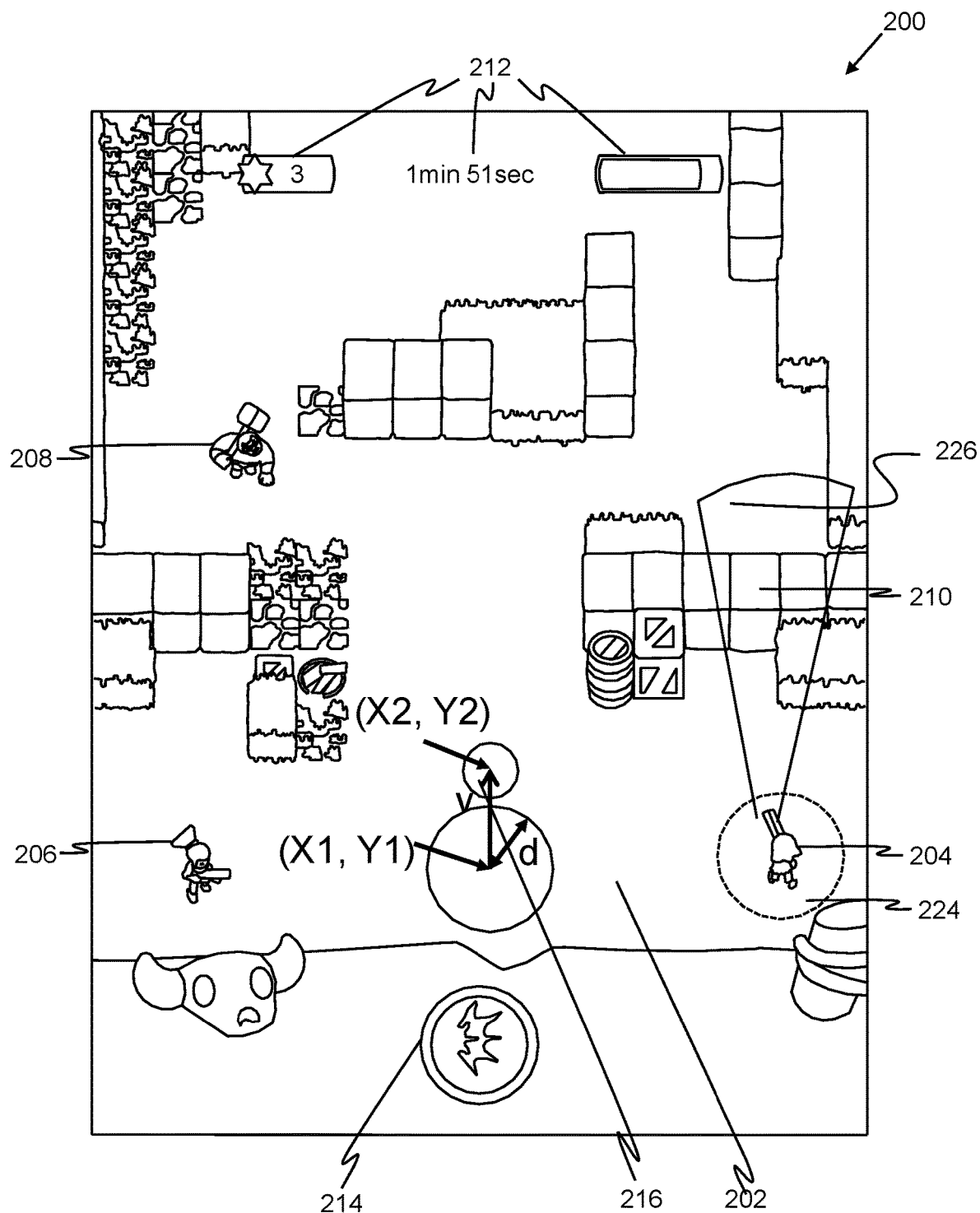

FIGS. 2A, 2B and 2C are a user interface 200 of the apparatus 100 of FIG. 1, in accordance with an embodiment of the present disclosure. As shown, the user interface 200 comprises a playing field 202 and a first object 204 (player-controlled character). The playing field 202 further comprises other objects 206 (character controller by another player) and 208 (computer-controlled character). The playing field 202 also comprises various obstacles, such as a wall 210. As shown, the user interface 200 further comprises indicators 212 and a button 214. Referring to FIG. 2A a first contact 216 is detected with the user interface 200 at a first position (X1, Y1). In one embodiment, a movement of the first contact 216 is detected and the distance of the movement from the first position of the first contact 216 is determined. If the movement stays within a circle C 217 having mid point (X1, Y1) and a radius of pre-determined distance threshold d, a type of the first contact 216 is determined to be a move instruction. In this example, the radius d shown in FIG. 2A defines the predetermined movement threshold or distance.

In this example, the move instruction is configured to cause the first object 204 to move from an area of its current position 224 on the user interface 200 to an area of the first contact 216 when a release of the first contact 216 from the user interface is detected. The area of the first contact can refer to area at or proximity of the point where the release of the first contact 216 from the user interface is detected. The area can substantially same as the circle C 217.

Referring also to FIG. 2B, in one embodiment, if the detected movement of the first contact 216 from the first position (X1, Y1) is determined to extend or go outside of the circle C 217 having the mid point (X1, Y1), the circle C 217 representing the radius d of the pre-determined distance threshold, a type of the first contact 216 is determined to be an action contact.

In this example, as shown in FIG. 2B, a sector 226 is rendered in the user interface 200. In the example of FIG. 2B, the sector 226, which is generally illustrated as a cone shape, extends in a direction that has an origin at or near the position 224 of the first object 204. The other end of the sector 226, which in this example is wider than the origin, generally extends to an area at or near the second position (X2, Y2).

In one embodiment, the sector 226 can be generated when a release of the movement from the user interface 200 is detected. In an alternate embodiment, the sector 226 can be generated as soon the movement is determined to extend beyond the radius d. For example, this include when the distance between (X1, Y1) and (X2, Y2), or from (X1, Y1) to (X2, Y2) is determined to be greater than d. Although the illustration of the sector 226 is generally shown herein as a cone shape indicator, the aspects of the disclosed embodiments are not so limited. In alternate embodiments, the sector 226 can be presented on the user interface 200 in any suitable form that generally illustrate a region or area where the action can take place, as that is further described herein.

An action, such as shooting, is executed when a release from the user interface is detected. The shooting takes place in the direction of the sector 226. Alternatively (as illustrated in FIG. 2C) the apparatus can be configured to render the sector 226 in a direction of a direction vector v in respect to the first object 204. The direction vector v is a vector defined by co-ordinates (X1, Y1) and (X2, Y2).

In the example of FIG. 2A, for the type of the first contact 216 to be a move instruction, the "movement" of the first contact 216 can be any movement that does not extend further than the radius r of the circle C 217. This "movement" can include any movement within the circle C 217, or no movement at all.

For example, in one embodiment, the first contact 216 can move any determined distance for any extent of time within the circle C 217. This can include a rotational movement, such as a circular movement of the first contact 216, for any number of rotations. As long as the movement of the first contact 216 does not extend beyond the radius d of the circle C 217, before a release of the first contact 216, the type of the first contact 216 will be determined to be a move instruction.

As another example, the movement of the first contact 216 could be a back and forth movement. Here again, as long as the movement does not pass beyond the boundary of the circle C 217, defined by the radius d, before the release of the first contact 216, the type of the first contact 216 will be determined to be a move instruction.

In this embodiment, the movement could also be no movement at all. For example, the first contact 216 could be a substantially stationary contact at a point or position within the circle C 217. In this example, the type of the movement will also be determined to be a move instruction.

In one embodiment, if at any time prior to a release of the first contact 216 it is detected that the movement goes beyond the radius d of the circle C 217, the type of movement will be determined to be an action instruction. For example, the movement of the first contact 216 is determined to traverse the boundary of the circle C 217, as defined by the radius d, representing the predetermined movement threshold. At this point, the movement of the first contact 216 will be determined to be an action movement, as that is generally defined herein.

In one embodiment, even if the movement of the first contact 216 goes back within the boundary of the circle C 217 defined by the radius d after the movement is determined to extend beyond the boundary, the type of movement will be determined to be an action instruction. Thus, referring to the example of FIG. 2B, if the movement of the first contact 216 extends to approximately the point (X2, Y2) beyond the radius d and then back to approximately (X1, Y1) within the radius d, before a detection of the release of the first contact 216 from the user interface 200, the type of movement will be determined to be a move instruction.

In other words, if the movement of the first contact 216 extends beyond the radius d at any time before a release of the first contact 216 is detected, even if slightly and only momentarily, the type of movement will be determined to an action instruction. If the movement of the first contact 216 remains within the confines of the boundary of the circle C 217, defined by the radius d, no matter how much movement there is, the type of movement will be determined to be a move instruction.

The pre-determined movement threshold, defined by the radius d in FIG. 2A, can be a user defined threshold. The value should be set so that the value d is the minimum movement value. Thus, if the movement goes outside of or beyond the radius d, the movement is an action type instruction. If the movement remains within the boundary of radius d, the movement is a movement type of instruction. Further the pre-determined movement threshold can be a boarder of any arbitrary shape i.e. it is not limited to a circle with a radius. The shape can be oval, rectangular, triangular etc. In case of three dimensional (3D) displays the shape can include any geometrical 3D object such as sphere or cube wherein the pre-determined movement threshold would be an outer surface of such geometrical shape.

Figure 3:
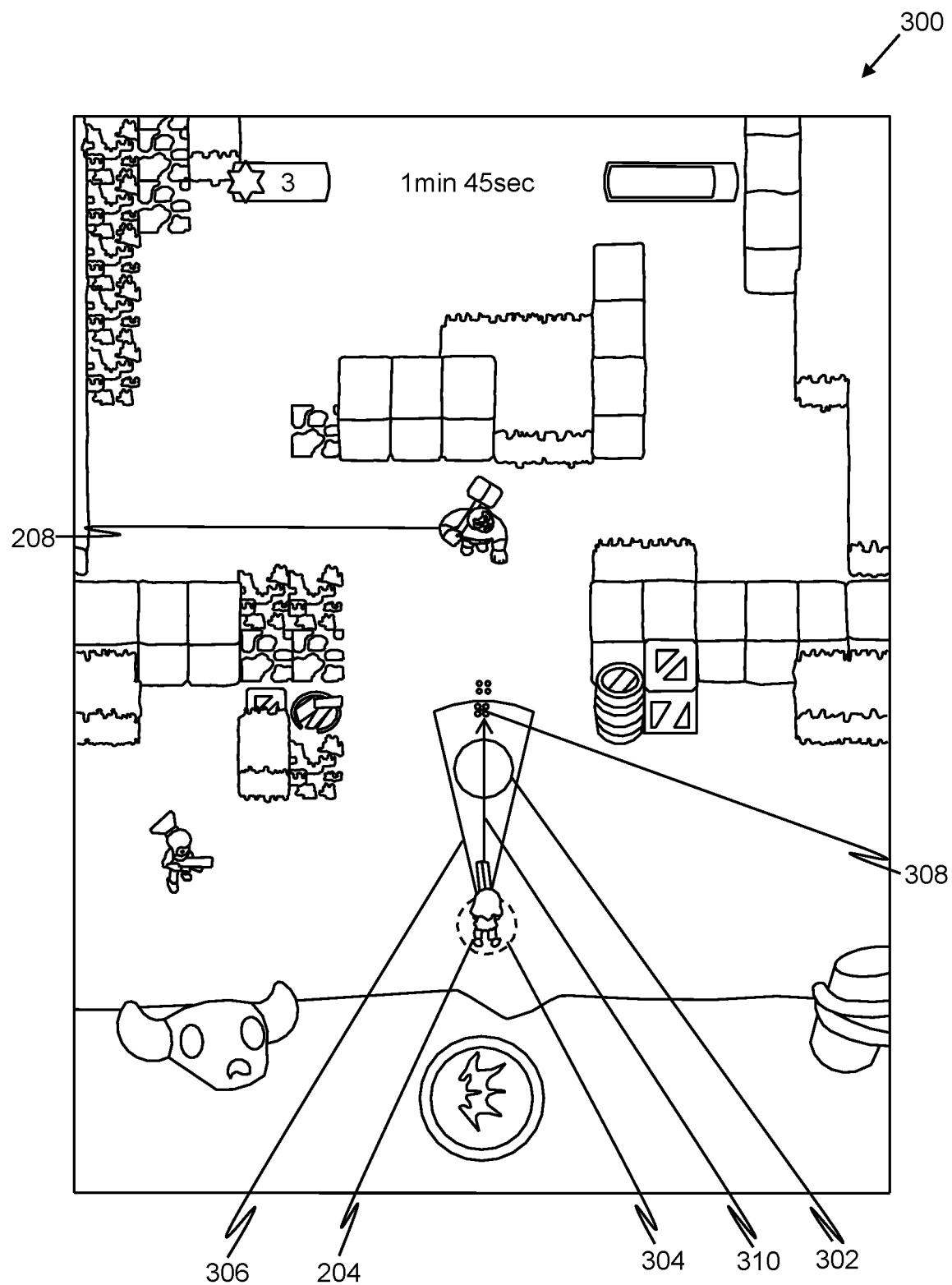

FIG. 3 is a user interface 300 of the apparatus 100 of FIG. 1, in accordance with another embodiment of the present disclosure. As shown, a sector 306 has been rendered in a first direction from the current position 304 of the first object 204 over the user interface 300. The sector 306 defines a path for the action 308 executed by the first object 204. Further, the action 308 comprises firing by the first object 204 on another object 208 on the user interface 300. Additionally, a trajectory line 310 is rendered on the user interface 300 from the area of the current position 304) and in the direction of a second position 302.

Figure 4:
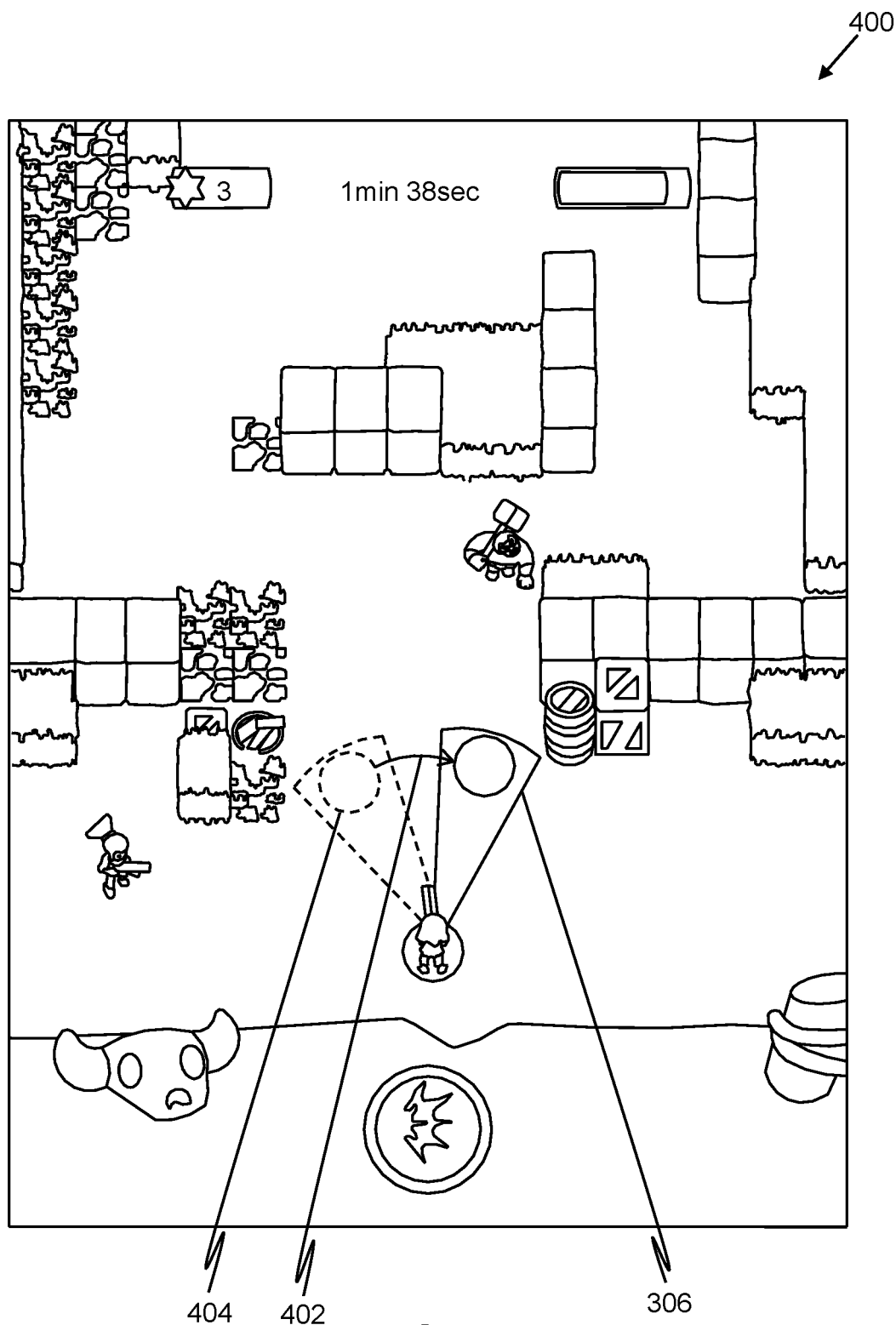

FIG. 4 is a user interface 400 of the apparatus 100 of FIG. 1, in accordance with yet another embodiment of the present disclosure. As shown, a rotational movement 402 of a first contact 404 has been detected on the user interface 400. Further, the sector 302 is rotated in a direction on the user interface 400 corresponding to the rotational movement 402.

Figure 5:
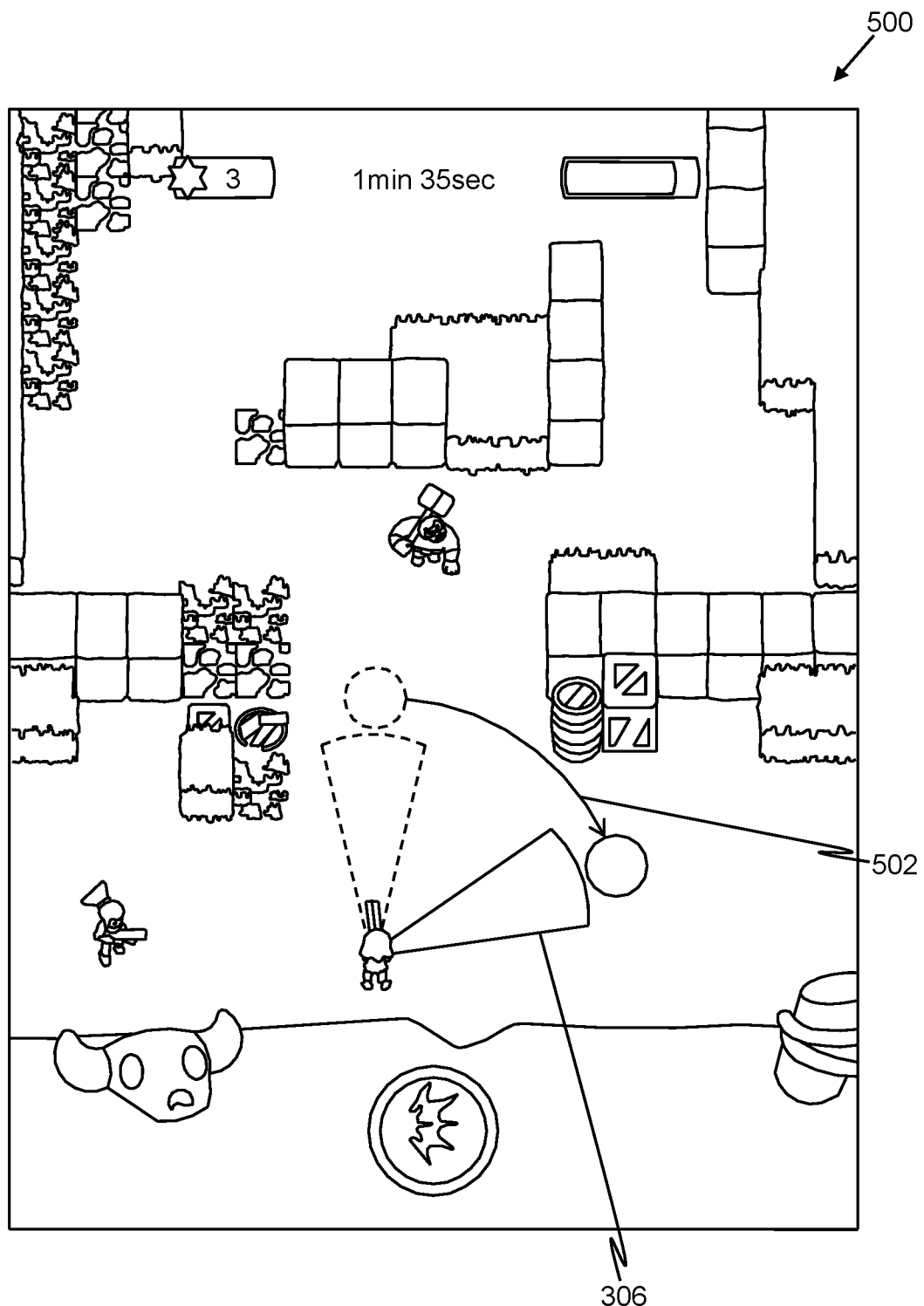

FIG. 5 is a user interface 500 of the apparatus 100 of FIG. 1, in accordance with an embodiment of the present disclosure. As shown, a rotational movement contact 502 is detected on the user interface 500, wherein the rotational movement contact 502 is made above an area defined by the sector 306. Further, the sector 306 is rotated in a direction on the user interface 500 corresponding to the rotational movement 502.

Figure 6:
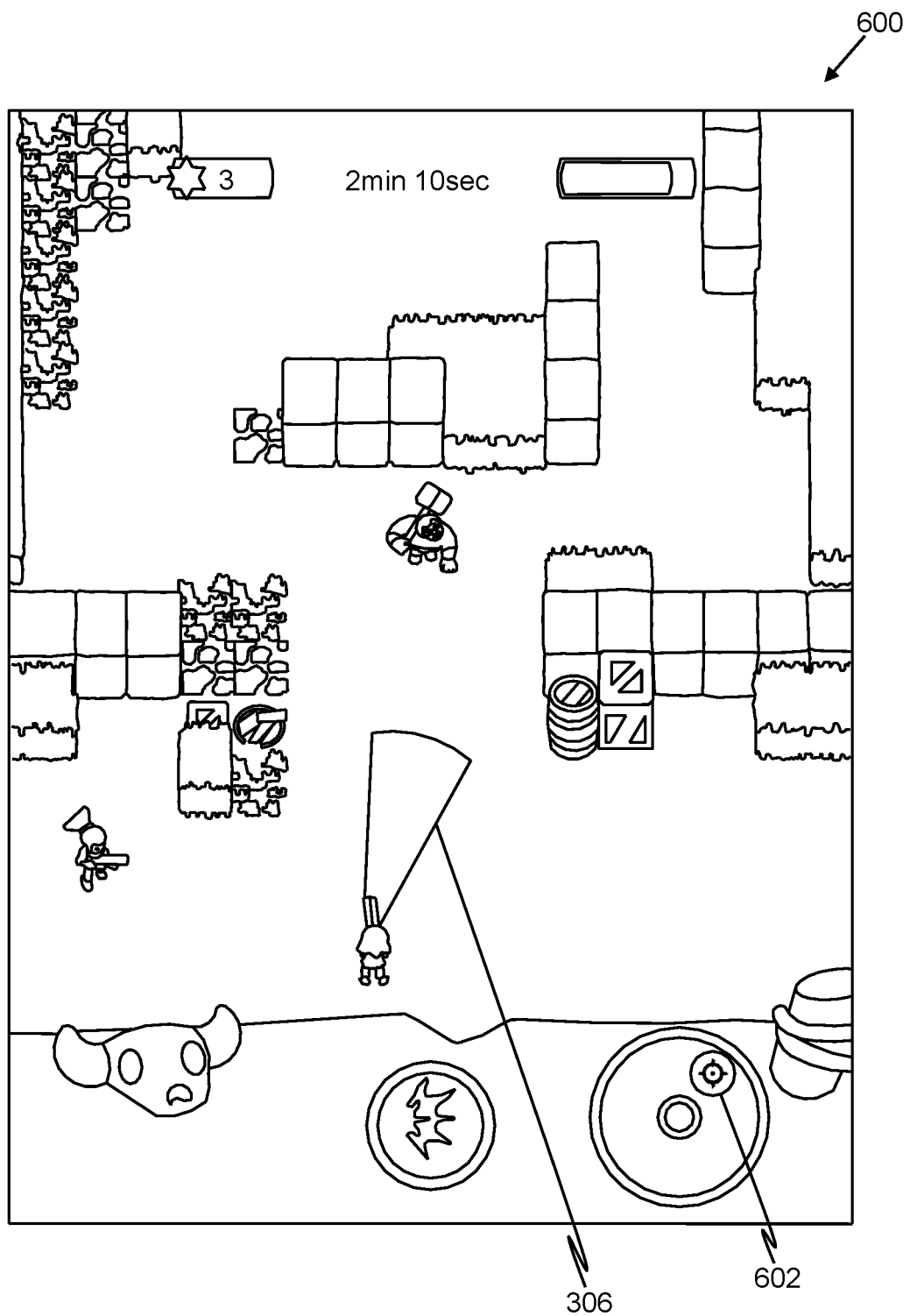

FIG. 6 is a user interface 600 of the apparatus 100 of FIG. 1, in accordance with another embodiment of the present disclosure. As shown, a control object 602 is rendered on the user interface 600, the control object 602 configured to be rotated in one or more of a clockwise and counter-clockwise direction to rotate the sector 306 in one or more of the clockwise or counter-clockwise direction.

Figure 7:
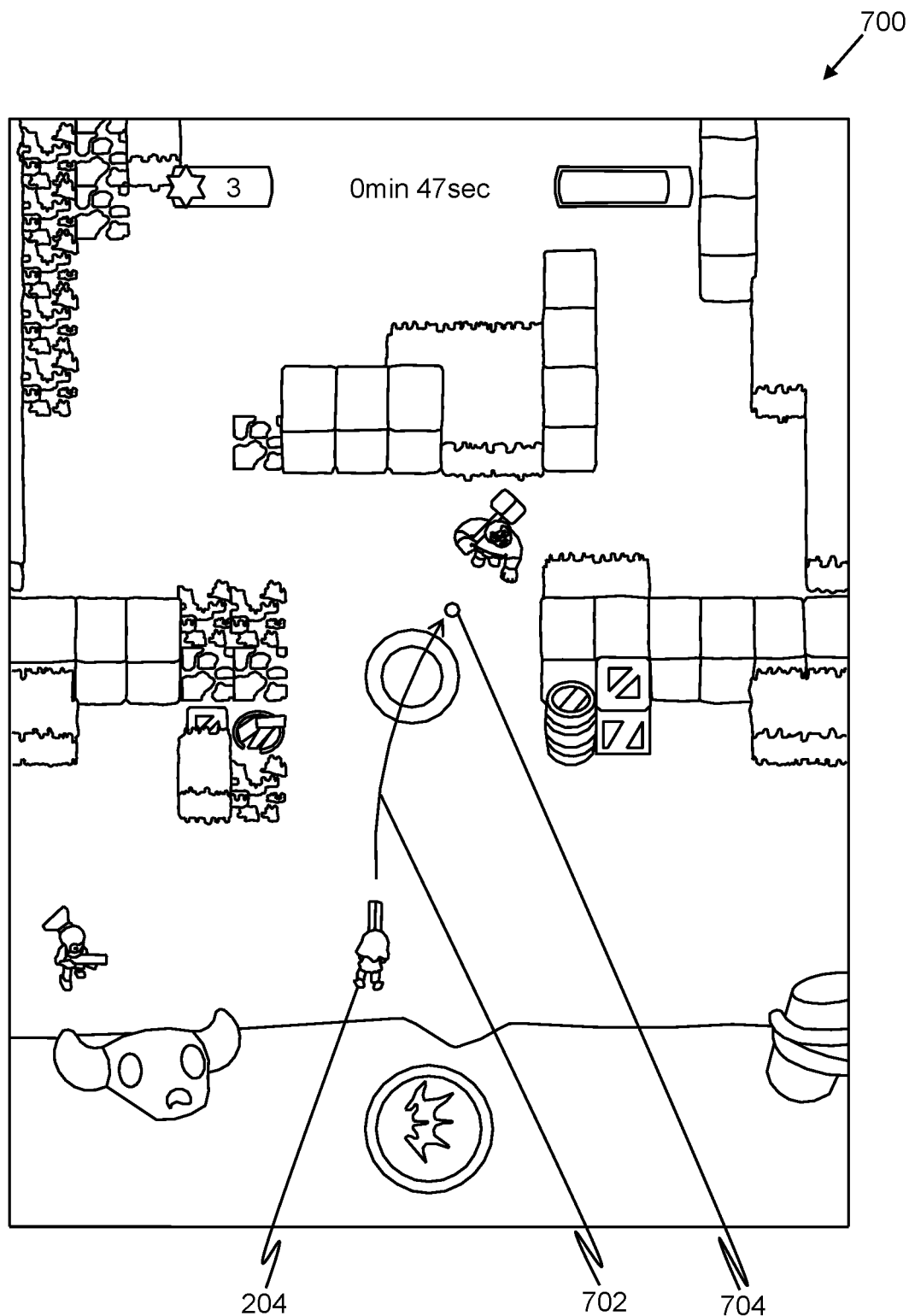

FIG. 7 is a user interface 700 of the apparatus 100 of FIG. 1, in accordance with yet another embodiment of the present disclosure. As shown, a pattern 702 drawn has been detected on the user interface 700, the pattern 702 defining a path for an action 704 executed by the first object 204. Further, the action 704 comprises discharging a projectile along the path defined by the drawn pattern 702.

Figure 8:
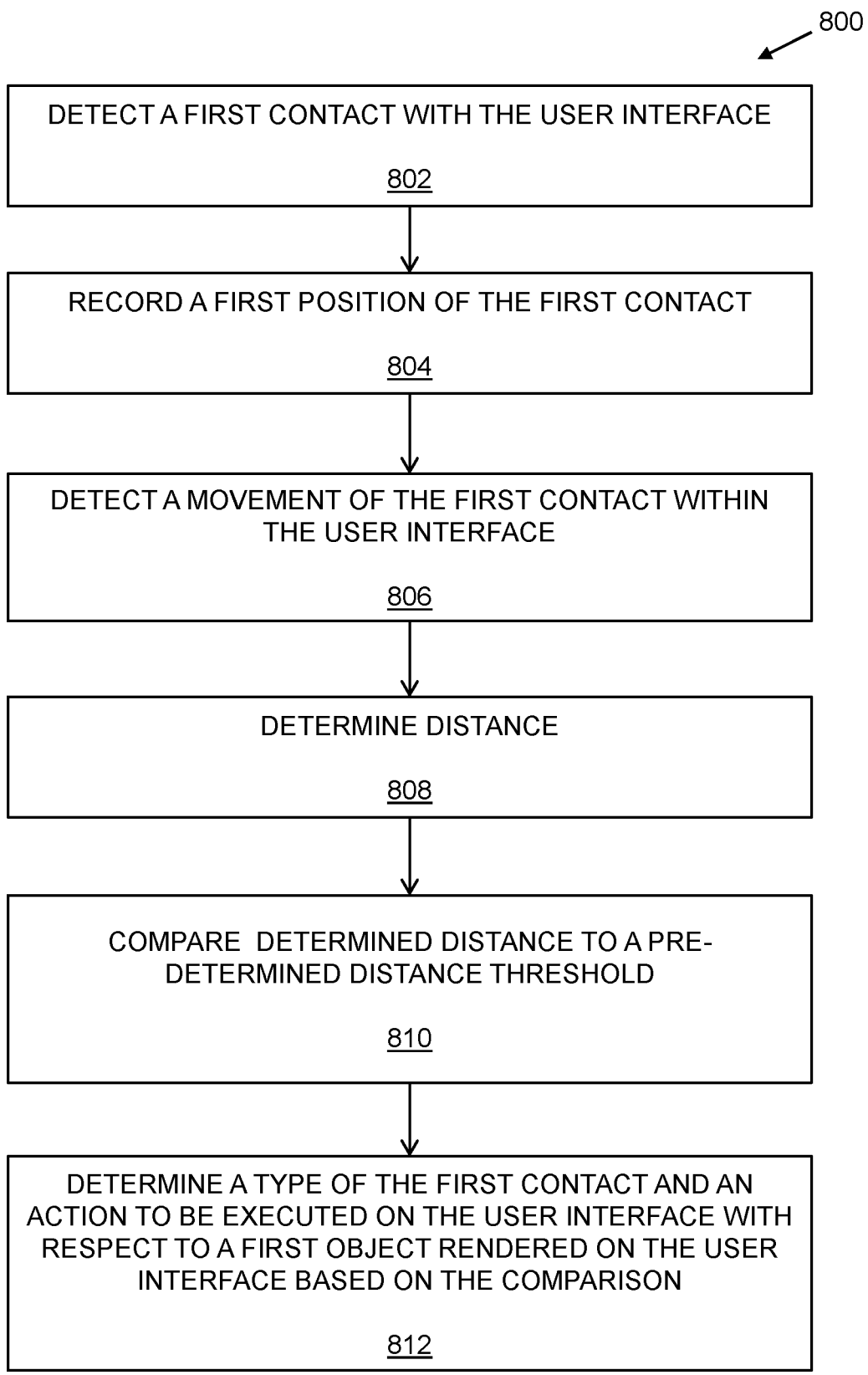
FIG. 8 illustrates steps of a method for controlling a user interface of a computing apparatus.

FIG. 8 illustrates steps of a method 800 for controlling a user interface of a computing apparatus. The computing apparatus comprises a processor configured to execute machine readable instructions. At step 802, a first contact with the user interface is detected. At step 804, a first position of the first contact is recorded. At step 806, a movement of the first contact (point) within the user interface from the first position to a second position is detected. At step 808, a distance between the first position and the second position is determined. At step 810, the determined distance compared to a pre-determined distance threshold. At step 812, a type of the first contact and an action to be executed on the user interface with respect to a first object rendered on the user interface, are determined based on the comparison.

The steps 802 to 812 are only illustrative and other alternatives can also be provided where one or more steps are added, one or more steps are removed, or one or more steps are provided in a different sequence without departing from the scope of the claims herein, as illustrated above.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An apparatus comprising:
a touch sensitive user interface; and
a processor;
wherein the processor is configured to:
render a player controlled character on the user interface;
detect a first contact with the user interface at a first position;
determine a change in position of the first contact from the first position on the user interface to a second position on the user interface;
determine a magnitude of the change in position; and
if the processor determines that the magnitude of the change in position is within a first range of values, the processor is configured to reposition the player controlled character from a current position to the first position on the user interface; or
if the processor determines that the magnitude of the change in position is within a second range of values, the processor is configured to present a graphical indicator on the user interface that extends from the current position of the player controlled character towards the second positon of the first contact on the user interface and cause the player controlled character to execute a function in a direction indicated by the graphical indicator on the user interface.

2. The apparatus according to claim 1, wherein the graphical indicator has an origin corresponding to the current position of the player controller character and an end that corresponds to the second position of the first contact.

3. The apparatus according to claim 2, wherein the graphical indicator is in a form of a sector cone.

4. The apparatus according to claim 1 wherein the processor is further configured to:
detect that a position of the first contact at the first position is one of left, right, above or below the current position of the player controlled character;
detect that the magnitude of the change in position is within the second range of values;
generate a sector cone as the graphical indicator on the user interface from the current position of the player controller character; and
detect a rotational movement contact on the user interface and rotate the sector cone corresponding to the detected rotational movement.

5. The apparatus according to claim 4, wherein the processor is further configured to detect a release of the rotational movement contact on the user interface and further execute an action instruction on at least one other object on the user interface.

6. The apparatus according to claim 1, wherein the execution of the function comprises removing at least one other object from presentation on the user interface.

7. The apparatus according to claim 1, wherein the processor is configured to render a control object on the user interface, the control object being configured to be rotated in one or more of a clockwise and counter-clockwise direction, wherein rotation of the control object is configured to cause a rotation of the graphical indicator in one or more of the clockwise or counter-clockwise direction.

8. The apparatus according to claim 1 wherein the processor is further configured to render a trajectory line on the user interface between the current position of the player controller character and the second position when the magnitude of the change in position is within the second range of values.

9. The apparatus according to claim 1, wherein the processor is further configured to determine a second distance on the user interface between the current position of the player controller character and the second position when the magnitude of the change in position is determined to be within the second range of values, wherein the processor uses the second distance to determine a reach of the execution of the function.

10. The apparatus according to claim 1, wherein the second range of values is between approximately 3% to and including approximately 12% of a distance between opposite sides of the user interface.

11. The apparatus according to claim 1, wherein the first range of values is less than approximately 12% of a distance between opposite sides of the user interface.

12. A method for controlling a user interface of a computing apparatus, the computing apparatus comprising a processor configured to execute machine readable instructions, wherein execution of the machine readable instructions by the processor causes the processor to:
    render a player controlled character on the user interface
    detect a first contact with the user interface at a first position on the user interface;
    determine a change in position of the first contact from the first position on the user interface to a second position on the user interface;
    determine a magnitude of the change in position; and
    if the processor determines that the magnitude of the change in position is within a first range of values, the processor is configured to reposition the player controlled character from a current position to the first position on the user interface; or
    if the processor determines that the magnitude of the change in position is within a second range of values, the processor is configured to present a graphical indicator on the user interface that extends from the current positon of the player controlled character towards the second position of the first contact on the user interface and cause the player controlled character to execute a function in a direction indicated by the graphical indicator on the user interface.

13. The method according to claim 12, wherein the method further comprises the processor being configured to detect that a position of the first contact at the first position is one of left, right, above or below the current position of the player controlled character;
    detect that the magnitude of the change of position is within the second range of values;
    generate a sector cone as the graphical indicator on the user interface from the current position of the player controlled character; and
    detect a rotational movement contact on the user and rotate the sector cone corresponding to the detected rotational movement.

14. The method according to claim 13, wherein the method includes the processor detecting a release of the rotational movement contact on the user interface and further executing an action instruction on at least one other object presented on the user interface.

15. The method according to claim 12, wherein the execution of the function comprises a firing by the player controlled character on the at least one another object.

16. The method according to claim 12, wherein the method further includes the processor causing a rendering of a control object on the user interface, the control object being configured to be rotated in one or more of a clockwise and counter-clockwise direction and rotate the graphical indicator in one or more of the clockwise or counter-clockwise direction.

17. The method according to claim 12 wherein the method further includes the processor causing a rendering of a trajectory line on the user interface between the current position of the player controlled character and the second position when the magnitude of the change in position is within the second range of values.

18. The method according to claim 12, wherein the method further comprises the processor determining a second distance on the user interface between the current position of the player controlled character and the second position when the magnitude of the change in position is determined to be within the second range of values, wherein the processor uses the second distance to determine a reach of the execution of the function.

* * * * *